Figure 2A:
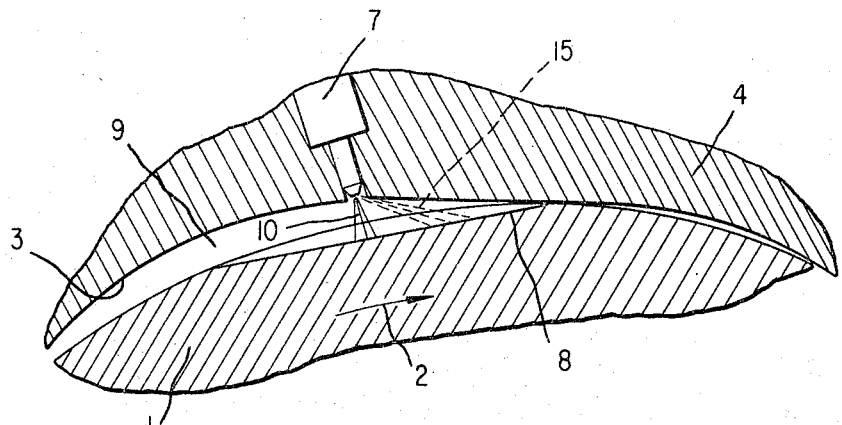

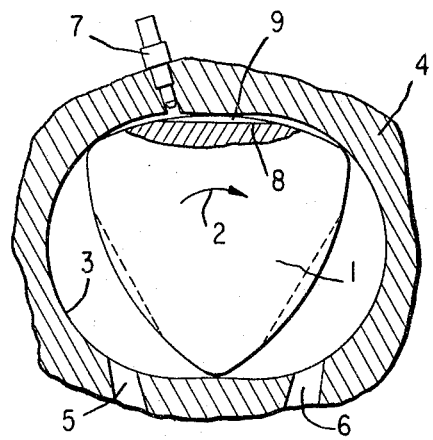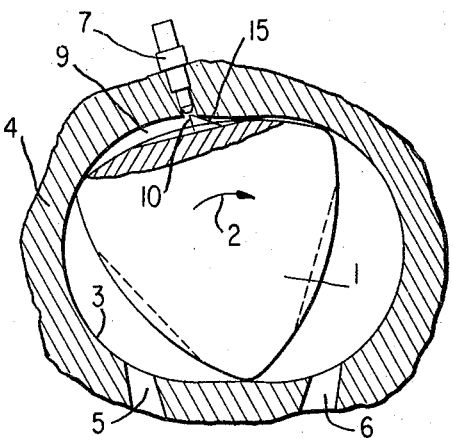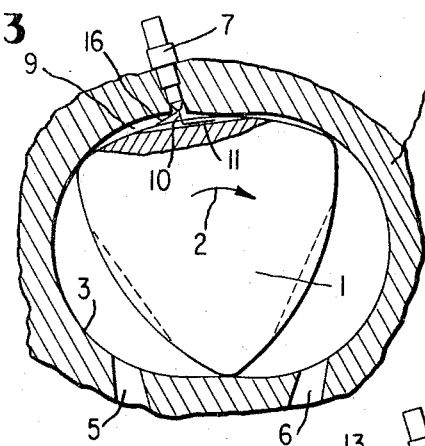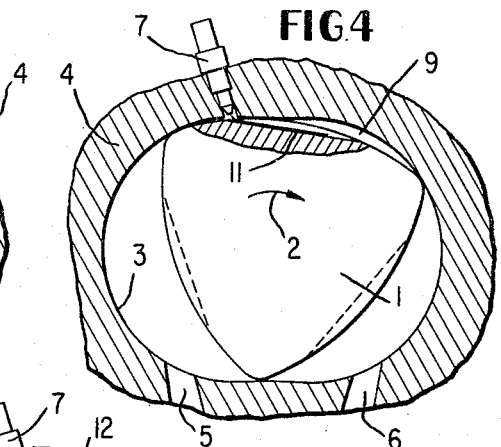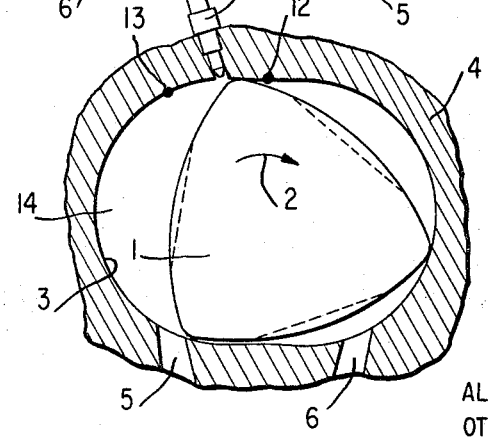

INVENTORS
ALFRED H. MÜLLER
OTFRIED STUMPP

BY *Hicke, Craig & Freudenberg*

ATTORNEYS

United States Patent Office  3,331,358
Patented July 18, 1967

3,331,358
ROTARY PISTON INTERNAL COMBUSTION ENGINE OF THE DIESEL TYPE
Alfred H. Müller, Waiblingen, and Otfried Stumpp, Sigmaringen, Germany, assignors to Daimler-Benz Aktiengesellschaft, Stuttgart-Unterturkheim, Germany
Filed Apr. 7, 1961, Ser. No. 101,549
Claims priority, application Germany, Apr. 30, 1960
D 33,225
3 Claims. (Cl. 123—8)

The present invention relates to a rotary-piston internal combustion engine in the construction thereof as diesel engine, and more particularly to an epitrochoidal rotary-piston engine internal combustion engine provided with a polygon as internal or external envelope form.

The present invention essentially consists in arranging and constructing the injection nozzle in such a manner that it injects with a compact jet against the piston surface. As a result of such an arrangement, there is achieved a precipitation of a fuel-film on the piston passing the injection nozzle which fuel-film evaporates continuously at the hot piston surface. By reason of the flow of the combustion air resulting from the movement of the piston within the combustion space, the fuel vapor is subjected to an eddying movement or turbulence so that all prerequisites are present to extend time-wise the combustion of the fuel-air-mixture and thereby achieve a soft combustion process.

According to a further feature of the present invention, the jet of the injection nozzle may be directed essentially radially to the piston. The jet of the injection nozzle, however, may also have a component in the rotary direction of the piston. Additionally, a second jet of the injection nozzle may be directed oppositely to the direction of rotation of the piston in order to initiate more rapidly the ignition.

Particularly favorable conditions are attained if, according to a further feature of the present invention, the injection nozzle is disposed in the housing essentially between the center of the combustion space in the upper dead center position of the piston and the place of greatest pressure difference between the combustion space and the lagging or trailing compression space. As a result thereof, the combustion is initiated in the trailing or lagging part of the combustion space. By reason of the pressure increase produced by the combustion, burning gases together with the unburned fuel are blown into the preceding or leading part of the combustion space where the remainder of the fuel is burned by the air present therein. This represents a type of pre-chamber effect which assures the additional good turbulence. The entire air present in the combustion space is utilized thereby for the combustion purpose and therewith a smoke-free exhaust is assured.

Accordingly, it is an object of the present invention to provide a rotary-piston internal combustion engine which assures complete combustion of the combustion air in a simple and effective manner.

Another object of the present invention resides in the provision of a rotary-piston engine, especially adapted for diesel operation, in which the combustion of the fuel-air is extended temporarily to obtain a relatively soft combustion process.

Still a further object of the present invention is the provision of injection means for a rotary piston internal combustion engine so arranged and constructed as to assure complete combustion as well as a rapid initiation of the ignition of the combustible mixture.

Another object of the present invention resides in the provision of a rotary-piston engine provided with injection means for the fuel which effectively produces a pre-chamber effect insofar as the combustion process is concerned.

Another object of the present invention is the provision of an injection system and construction of the rotary-piston engine which assures complete utilization of all the combustion air present within the combustion space and therewith a smoke-free exhaust.

Figure 3A:
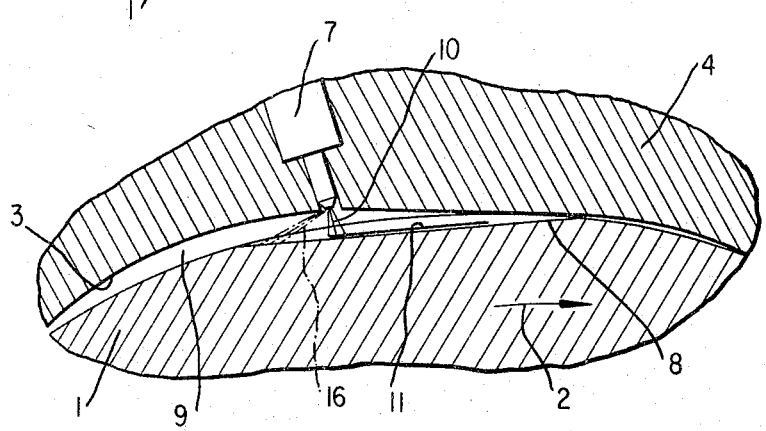
Figure 4A:
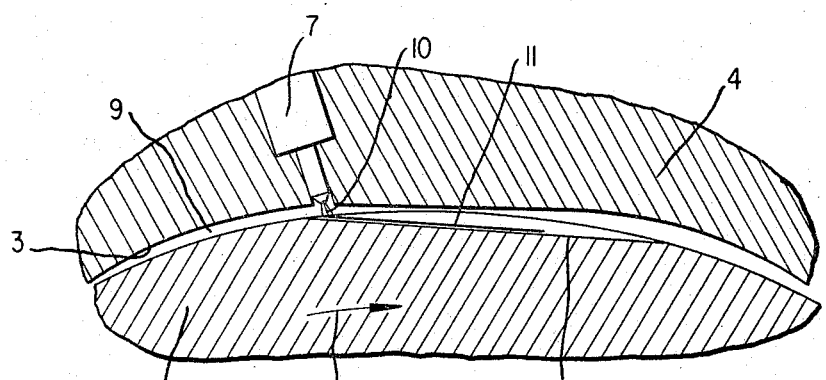

These and other objects, features and advantages of the present invention will become more obvious from the following description when taken in connection with the accompanying drawing which shows, for purposes of illustration only one embodiment in accordance with the present invention, and wherein FIGURES 1 through 5 are partial cross sectional views through the housing of an epitrochoidal rotary-piston internal combustion engine provided with a triangle as internal envelope form, illustrating the position of the piston at different times of the operation of the engine, and FIGURES 2a, 3a and 4a are partial cross sectional views, on an enlarged scale, showing the arrangement and location of the various parts corresponding to the position thereof illustrated in FIGURES 2, 3 and 4.

Referring now to the drawing wherein like reference numerals are used throughout the various views to designate like parts, reference numeral 1 designates in FIGURES 1 through 5 the piston of the rotary-piston internal combustion engine which has an envelope-form the configuration of a triangle the corners of which follow, during the movement in the direction of arrow 2, a contour of the piston path or track within the stationary housing 4 representing an epitrochoidal curve. The inlet channel is designated by reference numeral 5 and the outlet channel by reference numeral 6 whereas reference numeral 7 designates an injection nozzle of any suitable construction.

In the position illustrated in FIGURE 1, the piston 1 occupies with the piston surface 8 thereof the upper dead center position, i.e., the combustion space 9 limited or defined by the piston path or piston track 3 and the piston surface 8 has the smallest volumetric content. Before the piston 1 reaches the upper dead center position and is in the position thereof approximately shown in FIGURE 2, of which the details are shown on an enlarged scale in FIGURE 2a, fuel is injected by means of an injection nozzle 7 into the combustion space 9 in such a manner that a compact jet 10 impinges, directed essentially radially radially with respect to the piston 1, against the hot piston surface 8 and forms thereat a fuel blob. Since the piston 1 moves at the same time in the direction of arrow 2, the fuel effectively forms a trail or trace on the piston surface 8, and the piston surface is covered with a fuel film 11 as a result thereof. The fuel thereby evaporates continuously on the hot piston surface 8 and, as a result of the movement of piston 1, there takes place a flow of the combustion air which effectively peels off the fuel from the piston surface 8 and thereby subjects the fuel vapor to turbulence. The air flow is produced as squeeze-flow by reason of the movement of the piston displacing the air in a manner, known per se.

When the piston 1 assumes the position thereof indicated approximately in FIGURE 3, of which the various parts are shown on an enlarged scale in FIGURE 3a, the fuel-air mixture commences to ignite within the combustion space 9. Since the ignition is initiated at first in the trailing or lagging space part of the combustion space 9, burning gases together with the unburnt fuel particles are, as a result of the increase in pressure produced by the combustion, blown into the preceding or leading space portion where the remainder of the fuel is burnt by the air present therein. Consequently, all of the air present within the combustion space is utilized for purposes of combustion which assures a smoke-free exhaust.

Near the end of the injection operation, the piston 1 assumes approximately the position thereof indicated in FIGURE 4 which again is shown on an enlarged scale in FIGURE 4a.

As shown in FIGURE 5, which shows the position of the piston at the end of the combustion, the injection nozzle 7 is disposed essentially between the center 12 of the combustion space in the upper dead center position of the piston and the place 13 of the greatest pressure difference between the combustion space 9 and the trailing or lagging compression space 14 along the piston path or track 3.

Instead of a jet 10 directed essentially radially with respect to the piston 1, the jet may also have a component 15 in the direction of rotation of the piston, as shown in FIGURES 2 and 2a.

In order to initiate ignition even more rapidly and thereby shorten the ignition process, it is also possible in accordance with the present invention to inject, inaddition to the jets 10 and/or 15, a jet 16 as shown in FIGURES 3 and 3a in a direction opposite to the direction of rotation of the piston 1 whereby this jet 16 injects appropriately a smaller amount of fuel.

While we have shown and described one embodiment in accordance with the present invention, it is understood that the same is not limited thereto but is susceptible of many changes and modifications within the spirit and scope of the present invention and we, therefore, do not wish to be limited thereto to the details shown and described herein but intend to cover all such changes and modifications as are encompassed by the scope of the appended claims.

We claim:

1. A rotary piston internal combustion engine constructed as epitrochoidal rotary-piston diesel engine, comprising rotary polygonal piston means adapted to rotate in a predetermined manner to provide effectively a plurality of spaces delimited by the piston corners and including a combustion space followed in the direction of rotation by a compression space, and injection means including injection nozzle means for injecting fuel into said combustion space in a first compact jet essentially against the hot piston surface of said piston means and in a second jet directed oppositely to the direction of rotation of said piston means to cover the piston surface with a fuel film which evaporates therefrom continuously so that the flow of combustion air caused by rotation of said piston means effectively peels off the fuel from said hot piston surface and subjects the fuel vapor to turbulence, said injection nozzle means being located within a zone disposed between the center of said combustion space in a position corresponding to the upper dead center position of said piston means, on the one hand, and the place of the largest pressure difference between said combustion space and said compression space so that combustion is initiated in the trailing portion of said combustion space and the burning gases together with the unburn fuel particles are blown into the leading combustion space portion where the remainder of the fuel is burnt by the air present therein.

2. A rotary piston internal combustion engine constructed as epitrochoidal rotary-piston diesel engine, comprising rotary polygonal piston means adapted to rotate in a predetermined manner to provide effectively a plurality of spaces delimited by the piston corners and including a combustion space followed in the direction of rotation by a compression space, and injection means including injection nozzle means for injecting fuel into said combustion space in a first compact jet essentially radially directed against the hot piston surface of said piston means and in a second jet directed oppositely to the direction of rotation of said piston means to cover the hot piston surface with a fuel film which evaporates therefrom continuously so that the flow of combustion air caused by rotation of the piston effectively peels off the fuel from said piston surface and thereby subjects a fuel vapor to turbulence, said injection nozzle means being located within a zone disposed between the center of said combustion space in a position corresponding to the upper dead center position of said piston means, on the one hand, and the place of the largest pressure difference between said combustion space and said compression space so that combustion is initiated in the trailing portion of said combustion space and the burning gases together with the unburnt fuel particles are blown into the leading combustion space portion where the remainder of the fuel is burnt by the air present therein.

3. A rotary piston internal combustion engine constructed as epitrochoidal rotary-piston diesel engine, comprising rotary polygonal piston means adapted to rotate in a predetermined manner to provide effectively a plurality of spaces delimited by the piston corners and including a combustion space followed in the direction of rotation by a compression space, and injection means including injection nozzle means for injecting fuel into said combustion space in a first compact jet with a component in the normal direction of rotation of said piston means essentially against the hot piston surface of said piston means and in a second jet directed oppositely to the direction of rotation of said piston means to cover the hot piston surface with a fuel film which evaporates therefrom continuously so that the flow of combustion air caused by the rotation of the piston effectively peels off the fuel from said hot piston surface and subjects the fuel vapor to turbulence, said injection nozzle means being located within a zone disposed between the center of said combustion space in a position corresponding to the upper dead center position of said piston means, on the one hand, and the place of the largest pressure difference between said combustion space and said compression space so that combustion is initiated in the trailing portion of said combustion space and the burning gases together with the unburnt fuel particles are blown into the leading combustion space portion where the remainder of the fuel is burnt by the air present therein.

References Cited
UNITED STATES PATENTS

| | | | |
|---|---|---|---|
| 1,235,786 | 8/1917 | Fleming | 123—8 |
| 1,780,443 | 11/1930 | Schumann | 123—8 |
| 2,027,972 | 1/1936 | Haller et al. | 123—16 |
| 2,283,433 | 5/1942 | Gross | 123—16 |
| 2,302,254 | 11/1942 | Rhine | 123—16 |
| 2,595,915 | 5/1952 | Barber | 123—32.61 |
| 2,803,229 | 8/1957 | Schwaiger | 123—32.6 |
| 2,902,011 | 9/1959 | Hoffmann | 123—32.61 |
| 2,966,898 | 1/1961 | Rydberg et al. | 123—16 |
| 2,979,042 | 4/1961 | Bentele | 123—8 |
| 2,988,065 | 6/1961 | Wankel et al. | 123—8 |
| 3,292,600 | 12/1966 | Liebel | 123—8 |

FOREIGN PATENTS 496,342  11/1938  Great Britain.

OTHER REFERENCES

Wankel et al.: Bauart und gegenwartiger Entwicklungsstand einer Trochoiden—Rotationskolben-Maschine MTZ 21(2) pp. 33–45, February 1960.

MARK NEWMAN, *Primary Examiner.*

KARL J. ALBRECHT, FRED E. ENGETHALER, JOSEPH H. BRANSON, JR., *Examiners.*

RALPH D. BLAKESLEE, F. T. SADLER,
*Assistant Examiners.*